United States Patent
Saita

(10) Patent No.: US 10,919,402 B2
(45) Date of Patent: Feb. 16, 2021

(54) NON-CONTACT POWER TRANSMISSION SYSTEM

(71) Applicant: HONDA MOTOR CO., LTD., Tokyo (JP)

(72) Inventor: Akira Saita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 16/011,675

(22) Filed: Jun. 19, 2018

(65) Prior Publication Data

US 2018/0375367 A1 Dec. 27, 2018

(30) Foreign Application Priority Data

Jun. 22, 2017 (JP) ................. 2017-122173

(51) Int. Cl.
*B60L 53/122* (2019.01)
*H02J 7/02* (2016.01)
(Continued)

(52) U.S. Cl.
CPC ........... *B60L 53/122* (2019.02); *B60L 53/126* (2019.02); *B60L 53/36* (2019.02); *B60L 53/39* (2019.02);
(Continued)

(58) Field of Classification Search
CPC . Y02E 60/12; H02J 7/025; H02J 5/005; H02J 17/00; H02J 7/0027; H02J 50/80; H02J 50/90; H02J 50/12; H02J 50/40; H02J 2310/48; H01F 38/14; Y02T 90/122; B60L 11/182; B60L 53/12; B60L 53/36; B60L 53/66; B60L 53/39; B60L 2250/16;
(Continued)

(56) References Cited

U.S. PATENT DOCUMENTS

2013/0181667 A1* 7/2013 Takeshita ................ B60L 53/12
                                                      320/108
2014/0292270 A1   10/2014 Ichikawa
(Continued)

FOREIGN PATENT DOCUMENTS

JP   2015-074266    4/2015
JP   2015-201914   11/2015
(Continued)

OTHER PUBLICATIONS

Japanese Office Action for Japanese Patent Application No. 2017-122173 dated Sep. 11, 2018.

Primary Examiner — Nathaniel R Pelton
Assistant Examiner — Mohammed J Sharief
(74) Attorney, Agent, or Firm — Amin, Turocy & Watson, LLP

(57) ABSTRACT

A server configured to aggregate height information of a primary coil of each charging station from a road surface is provided. When a signal expressing that charging is performed at the charging station at a desired position has been received from a secondary side control unit of an electric vehicle through a secondary side communications device of the electric vehicle, the server is configured to transmit to the secondary side control unit of the electric vehicle, the height information of the primary coil of the charging station at the desired position from the road surface.

7 Claims, 8 Drawing Sheets

(51) Int. Cl.
  *H02J 50/12* (2016.01)
  *B60L 53/36* (2019.01)
  *H02J 7/00* (2006.01)
  *H02J 50/80* (2016.01)
  *B60L 53/66* (2019.01)
  *B60L 53/39* (2019.01)
  *H02J 50/90* (2016.01)
  *B60L 53/126* (2019.01)
  *H02J 50/40* (2016.01)

(52) U.S. Cl.
  CPC ............ *B60L 53/66* (2019.02); *H02J 7/0027* (2013.01); *H02J 7/025* (2013.01); *H02J 50/12* (2016.02); *H02J 50/80* (2016.02); *H02J 50/90* (2016.02); *B60L 2240/62* (2013.01); *B60L 2240/70* (2013.01); *B60L 2250/16* (2013.01); *B60L 2260/32* (2013.01); *H02J 50/40* (2016.02)

(58) Field of Classification Search
  CPC ............ B60L 2240/70; B60L 2240/62; B60L 2260/32; B60L 53/126; B60L 53/122
  USPC .......................................... 320/108; 307/104
  See application file for complete search history.

(56) References Cited

U.S. PATENT DOCUMENTS

| 2015/0094887 A1* | 4/2015 | Kawashima ............ B60L 53/36 |
| | | 701/22 |
| 2015/0137801 A1* | 5/2015 | Raedy ................... B60L 53/305 |
| | | 324/207.15 |
| 2015/0224883 A1* | 8/2015 | Ichikawa ................ B60L 50/16 |
| | | 320/108 |
| 2016/0250935 A1* | 9/2016 | Yuasa ................... B60L 11/182 |
| | | 307/10.1 |
| 2017/0129358 A1 | 5/2017 | Taniguchi |

FOREIGN PATENT DOCUMENTS

| JP | 2017-028953 | 2/2017 |
| WO | 2013069089 | 5/2013 |

* cited by examiner

NON-CONTACT POWER TRANSMISSION SYSTEM

CROSS-REFERENCE TO RELATED APPLICATION

This application is based upon and claims the benefit of priority from Japanese Patent Application No. 2017-122173 filed on Jun. 22, 2017, the contents of which are incorporated herein by reference.

BACKGROUND OF THE INVENTION

Field of the Invention

The present invention relates to a non-contact power transmission system for transmitting power between a primary coil and a secondary coil.

Description of the Related Art

Along with development of electric vehicles such as electric automobiles and hybrid automobiles, a technique regarding non-contact charging for charging a battery of an electric vehicle without contact has been developed. For the efficient non-contact charging, accurate positioning is necessary for a primary coil provided for a charging station and a secondary coil provided for a vehicle.

For example, International Publication No. WO 2013/069089 discloses a non-contact power transmission system for transmitting information on a charging station side to a vehicle side before the vehicle is parked at a power reception position of the charging station (paragraph [0202] in International Publication No. WO 2013/069089). The information on the charging station side is, for example, information regarding a primary coil, such as the size of the parking space or the height of the primary coil from a ground.

The vehicle having received the information regarding the primary coil determines whether the positioning between the primary coil and the secondary coil is possible on the basis of the information regarding the primary coil and the information regarding the secondary coil that is stored on the vehicle side, for example, the position of the secondary coil in the vehicle. If the positioning is possible, the power transmission is possible; if the positioning is not possible, the power transmission is impossible. This determination result is displayed in a display unit. By the display in the display unit, a driver can confirm the vehicle position appropriate for charging either before or after the charging is started (paragraphs [0158], [0160], and [0203] in International Publication No. WO 2013/069089).

SUMMARY OF THE INVENTION

In International Publication No. WO 2013/069089, however, whether the positioning is possible or the power transmission is possible cannot be determined unless the charging station side includes configuration of storing the information regarding the primary coil and transmitting the information regarding the primary coil to the vehicle side.

Moreover, in International Publication No. WO 2013/069089, even if it is determined that the positioning is possible, the displacement between the primary coil and the secondary coil may still occur when the vehicle is moved actually to the charging station for the positioning between the primary coil and the secondary coil.

The present invention has been made in view of such problems, and an object is to provide a non-contact power transmission system in which the positioning between the primary coil and the secondary coil can be performed accurately.

A non-contact power transmission system according to the present invention is a non-contact power transmission system for transmitting power without contact from a primary coil that is provided for a charging station to a secondary coil that is provided for a vehicle, and includes an information aggregation device configured to aggregate height information of the primary coil from a road surface at an installation position of each charging station, wherein when a signal expressing that charging is to be performed at the charging station at a desired position has been received from a control unit of the vehicle through a communications device of the vehicle, the information aggregation device is configured to transmit to the control unit of the vehicle, the height information of the primary coil of the charging station at the desired position from the road surface.

According to the present invention, the information aggregation device transmits to the control unit of the vehicle, the height information of the primary coil from the road surface in the charging station at the desired position among the charging stations installed at a plurality of positions. Thus, the non-contact charging of the vehicle at the charging station at the desired position can be assisted and therefore, the accurate positioning between the primary coil and the secondary coil can be performed.

In the above non-contact power transmission system, the vehicle includes the control unit configured to control positioning between the primary coil and the secondary coil and the control unit is configured to, when receiving a weak power transmitted from the primary coil for the positioning, perform the positioning between the primary coil and the secondary coil on a basis of the height information of the primary coil from the road surface that is transmitted from the information aggregation device.

In the configuration as above, a constant amount of weak power is transmitted from the primary coil for the positioning between the primary coil (charging station) and the secondary coil (vehicle). A weak voltage value corresponding to a voltage generated on the secondary coil side by the weak power received at the secondary coil is a voltage value (weak voltage value) in accordance with a difference between the height of the primary coil from the road surface and the height of the secondary coil from the road surface (the difference is referred to as vertical distance). Thus, the vertical distance can be estimated from the height information of the primary coil transmitted from the information aggregation device and the height information of the secondary coil of the own vehicle. As a result, the horizontal distance between the primary coil and the secondary coil for the weak voltage value can be estimated and the accurate positioning process can be performed.

In the positioning between the primary coil and the secondary coil in the aforementioned non-contact power transmission system, when the vehicle moves to be displaced toward the secondary coil and the control unit of the vehicle detects the voltage value generated by the weak power for first time, the control unit is configured to set a distance position from the secondary coil to an initial position for the positioning.

By the configuration as above, the initial position for the positioning by the weak power can be set certainly.

In the above non-contact power transmission system, the control unit of the vehicle includes in advance the relation between the voltage value and the horizontal distance between the primary coil and the secondary coil, and moreover, a relation between the horizontal distance and a weak voltage integrated value obtained by position-integration of the voltage value generated by the weak power.

In the configuration as above, a concavity may exist in a graph expressing the relation (weak voltage value characteristic) between the horizontal distance between the primary coil and the secondary coil, and the voltage value generated by the weak power. However, even if the concavity exists, the integrated value of the weak voltage value increases; therefore, by including the relation between the horizontal distance and the weak voltage integrated value, the positioning can be performed certainly.

In the above non-contact power transmission system, the vehicle is configured to calculate a differential value of the voltage value generated by the weak power, and determine whether the vehicle is at a position before passing the primary coil or after passing the primary coil on a basis of a moving direction of the vehicle and the differential value.

In the configuration as above, the differential value increases as the horizontal distance between the primary coil and the secondary coil becomes shorter. Therefore, by using the moving direction of the own vehicle additionally, whether the own vehicle is at a position before passing the primary coil or after passing the primary coil can be determined accurately.

According to the present invention, the information aggregation device transmits to the control unit of the vehicle, the height information of the primary coil from the road surface in the charging station at the desired position among the charging stations installed at the plurality of positions. Thus, the non-contact charging of the vehicle at the charging station at the desired position can be assisted and therefore, the accurate positioning between the primary coil and the secondary coil can be performed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a non-contact power transmission system according to the present invention will hereinafter be described in detail with reference to the attached drawings.

1. Configuration of Non-Contact Power Transmission System 10

Figure 1:
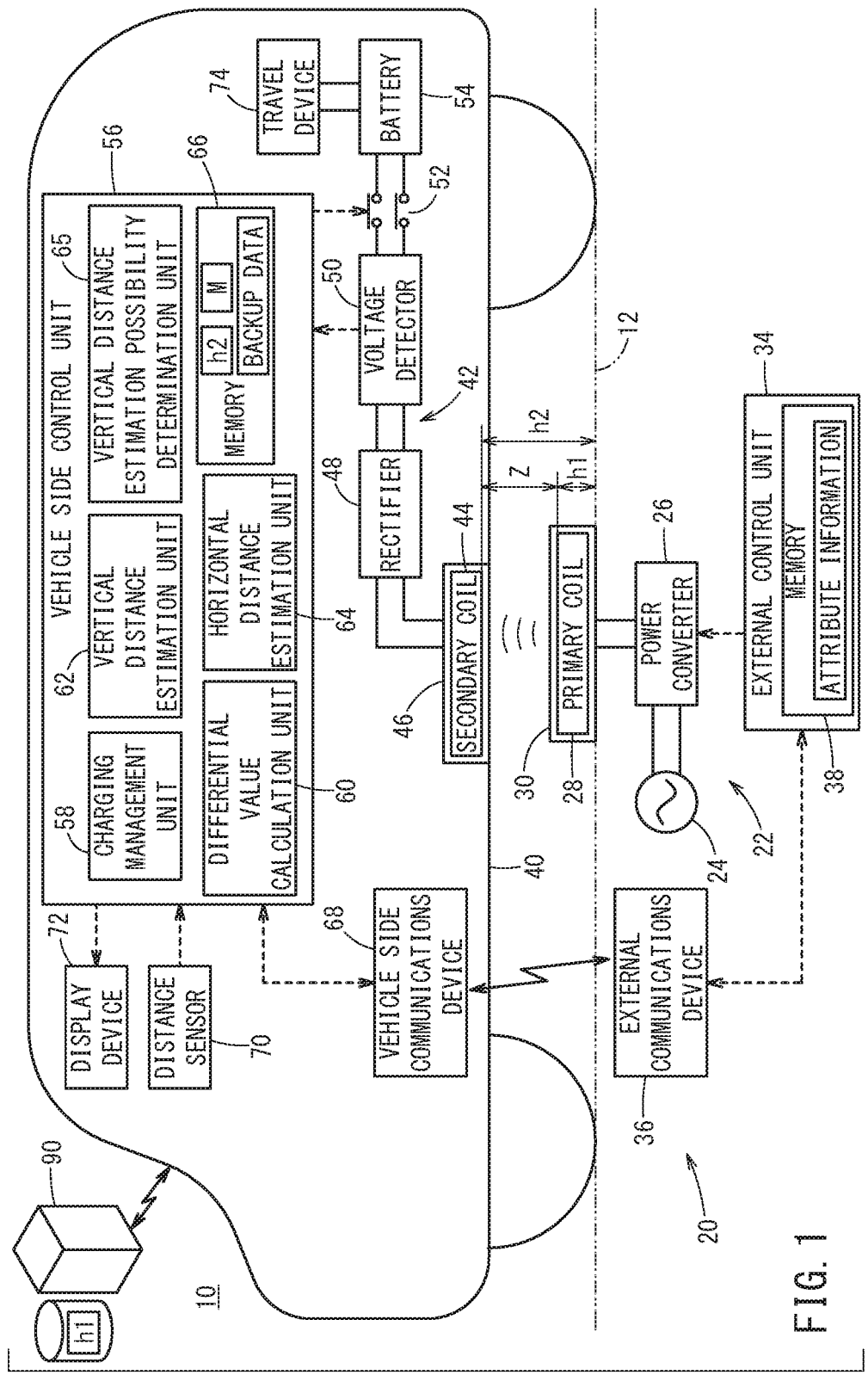
FIG. 1 is a system configuration diagram illustrating a non-contact power transmission system according to an embodiment of the present invention.

The configuration of a non-contact power transmission system 10 according to the embodiment of the present invention will be described with reference to FIG. 1. The non-contact power transmission system 10 includes a charging station 20 on a primary side (power supply side) that is provided on a ground (installation surface), an electric vehicle 40 on a secondary side (power reception side), and a server (information aggregation device) 90 that communicates with the electric vehicle 40 through a mobile communications network. In FIG. 1, components below a road surface (ground) 12 drawn with a two-dot chain line correspond to the charging station 20, and components above the road surface 12 drawn with the two-dot chain line correspond to the electric vehicle 40. Moreover, components on the upper left side of the electric vehicle 40 correspond to the server 90. In the non-contact power transmission system 10, a battery 54 mounted in the electric vehicle 40 is charged by the charging station 20 without contact.

The charging station 20 mainly includes a power transmission circuit 22, a primary side control unit (external control unit) 34, and a primary side communications device (external communications device) 36. The power transmission circuit 22 includes an alternating current power source 24, a power converter 26 that converts an alternating current power supplied from the alternating current power source 24 into a transmission power, and a primary capacitor (not shown) and a primary coil 28 for resonance. The primary coil 28 is covered with a primary pad 30 and disposed on the road surface 12. In FIG. 1, a reference sign h1 denotes the height of the primary coil 28 from the road surface 12.

In the primary side control unit 34, a processor such as a CPU (not shown) reads out programs stored in a memory 38 and executes the programs so that the primary side control unit 34 functions as a predetermined operation unit. In the present embodiment, the primary side control unit 34 functions as a power transmission controller that transmits a weak power for positioning between the primary coil 28 and a secondary coil 44, and a charging power for charging the battery 54 to the primary coil 28.

The primary side communications device 36 is connected to the primary side control unit 34 through a communications line. The primary side communications device 36 performs wireless communications with a secondary side communications device (vehicle side communications device) 68 of the electric vehicle 40. For example, wireless communications such as Wi-Fi (registered trademark) and Bluetooth (registered trademark) can be used.

The memory 38 in the primary side control unit 34 stores various programs and various numerical values including predetermined values, and moreover, the attribute information of the charging station 20, the ID unique to the charging station 20, and the like. The attribute information of the charging station 20 is the information regarding the attribute expressing whether the charging station 20 is a public charging station or a private (dedicated) charging station. The private charging station, which is different from the public charging station, is installed in a parking place at home or a friend's house, for example, and is mainly used to charge a particular electric vehicle (private vehicle, for example).

The electric vehicle 40 mainly includes a power reception circuit 42, the battery 54, a secondary side control unit (vehicle side control unit) 56, the secondary side communications device 68, a distance sensor 70, a display device 72, and a travel device 74. The power reception circuit 42 includes a secondary capacitor (not shown) and the secondary coil 44 for resonance, a rectifier 48 that rectifies a reception power (charging power, weak power) corresponding to the alternating current power received in the secondary coil 44, a voltage detector 50 that detects the voltage generated by the reception power (weak power), and a contactor 52 that switches electrical connection and disconnection between the power reception circuit 42 and the battery 54. The secondary coil 44 is covered with a secondary pad 46 and disposed on a lower surface of the electric vehicle 40. In FIG. 1, a reference sign h2 indicates the height of the secondary coil 44 from the road surface 12.

The voltage detector 50 includes a parallel circuit of a predetermined resistor and a voltage sensor, and a switch element (none of them are shown) as described in International Publication No. WO 2013/069089, for example. The voltage sensor detects voltage that is generated at both ends of the resistor when receiving the weak power. This voltage is referred to as a low power excitation (LPE) voltage.

The battery 54 includes a lithium ion battery or the like. When the contactor 52 is in a connected state to make the primary coil 28 and the secondary coil 44 magnetically coupled, the battery 54 is charged through the power reception circuit 42.

The secondary side control unit 56 is an ECU and manages a charging process. In the secondary side control unit 56, a processor (not shown) such as a CPU reads out programs stored in a memory 66 and executes the programs so that the secondary side control unit 56 functions as a charging management unit 58, a differential value calculation unit 60, a vertical distance estimation unit 62, a horizontal distance estimation unit 64, and a vertical distance estimation possibility determination unit 65.

The charging management unit 58 collectively controls the charging process. On the basis of a value of the LPE voltage V_LPE (hereinafter, this value is referred to as voltage value V_LPE) detected by the voltage detector 50 and a travel distance X of the electric vehicle 40 detected by the distance sensor 70, the differential value calculation unit 60 calculates the change amount of the voltage value V_LPE relative to the minute travel distance X, that is, a position differential value $dV/dX$ with respect to the LPE voltage.

The vertical distance estimation unit 62 estimates a vertical distance Z between the primary coil 28 and the secondary coil 44 by the following two methods. In a first method, the vertical distance estimation unit 62 estimates the vertical distance Z between the primary coil 28 and the secondary coil 44 on the basis of the height (height information) h1 of the primary coil 28 from the road surface 12 that is acquired from the server 90, and the height (height information) h2 of the secondary coil 44 from the road surface 12 that is stored in the memory 66. In a second method, the vertical distance Z between the primary coil 28 and the secondary coil 44 is estimated on the basis of the voltage value V_LPE, the position differential value $dV/dX$, and the voltage value-distance information that is stored in the memory 66 (FIG. 2).

The vertical distance when the center position of the secondary coil 44 coincides with the center position of the primary coil 28 in the plan view is referred to as a facing distance. When the center position of the secondary coil 44 coincides with the center position of the primary coil 28, the power reception efficiency of the weak power (weak power/ transmission power) is the maximum and the charging efficiency in charging the battery 54 (reception power/ transmission power) is also the maximum. Therefore, an object of the positioning process is to make the center position of the secondary coil 44 coincide with the center position (center) of the primary coil 28.

Figure 2:
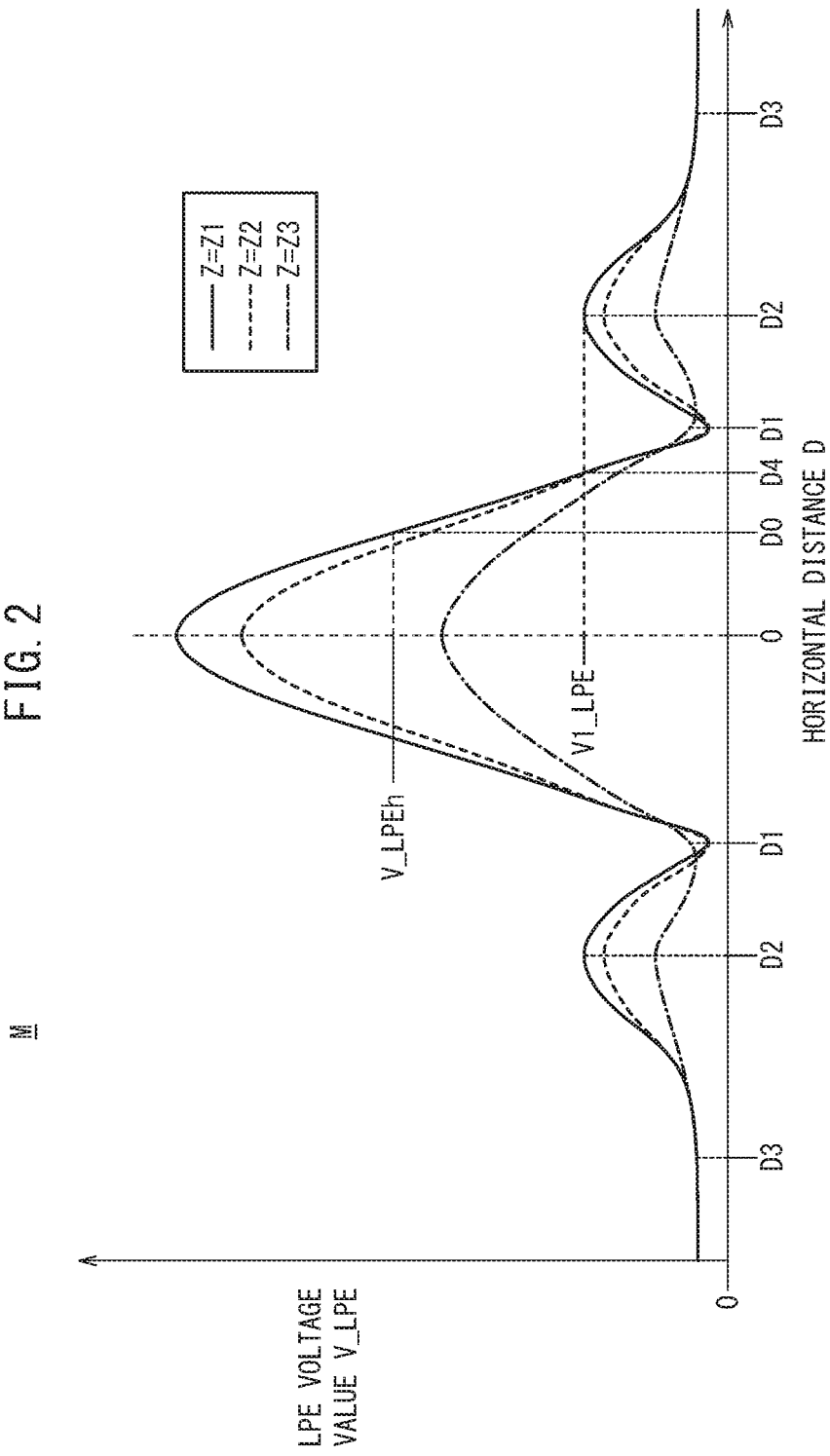
FIG. 2 is a characteristic diagram expressing voltage value-distance information.

The horizontal distance estimation unit 64 estimates the horizontal distance D (FIG. 3A) between the primary coil 28 and the secondary coil 44 on the basis of the voltage value V_LPE and the voltage value-distance information for the vertical distance Z (FIG. 2).

After the positioning between the primary coil 28 and the secondary coil 44 is completed and the parking of the electric vehicle 40 is completed, the vertical distance estimation possibility determination unit 65 determines whether it is possible to estimate the vertical distance Z between the primary coil 28 and the secondary coil 44. Specifically, whether the voltage value V_LPE detected by the voltage detector 50 is more than or equal to a predetermined threshold (V_LPEh in FIG. 2). If the voltage value V_LPE is more than or equal to the predetermined threshold, it is determined that the electric vehicle 40 is currently at the position where the charging is possible, and therefore the vertical distance Z between the primary coil 28 and the secondary coil 44 can be estimated.

After the positioning between the primary coil 28 and the secondary coil 44 is completed and the parking of the electric vehicle 40 is completed, the server 90 acquires through the mobile communications network from the electric vehicle 40, the height h1 of the primary coil 28 of the charging station 20 from the road surface 12 and stores the acquired height h1 therein. The server 90 functions as the information aggregation device that aggregates from the plural electric vehicles 40, the heights h1 of the primary coils 28 of the plural charging stations 20 from the road surface 12, and stores the heights h1 therein. In response to the transmission request from the electric vehicle 40, the server 90 transmits to the electric vehicle 40, the height h1 of the primary coil 28 of the charging station 20 from the road surface 12 that will transmit the power to the electric vehicle 40.

The secondary side communications device 68 is connected to the secondary side control unit 56 through a communications line. As described above, the secondary side communications device 68 performs wireless communications with the primary side communications device 36 of the charging station 20 through Wi-Fi (registered trademark) or the like, and performs wireless communications with a server side communications device (not shown) of the server 90 through the mobile communications network.

The travel device 74 includes a driving force device that generates a driving force in accordance with an occupant's operation of an accelerator pedal, and moreover includes a steering device that steers in accordance with an occupant's operation of a steering wheel, and a braking device that generates a braking force in accordance with an occupant's operation of a brake pedal. The driving force device includes an electric motor as a driving source to which the battery 54 supplies power.

2. Voltage Value-Distance Information

The memory 66 of the secondary side control unit 56 stores various programs and various numeral values including predetermined values, and the charging history of the electric vehicle 40. The charging history includes, for example, the ID of the charging station, the charging date and time, and the charging power amount in the past charging. In addition, the memory 66 stores a value of the vertical distance Z estimated in the previous charging in the charging station 20 as backup data. Furthermore, the memory 66 stores as a map M, the voltage value-distance information as expressed in FIG. 2. This voltage value-distance information is a characteristic of voltage value-distance that indicates a relation between a distance between a reference part of the primary coil 28 and a reference part of the secondary coil 44, and the voltage value V_LPE in accordance with the distance. More specifically, the voltage value-distance information is a characteristic of voltage value-distance that indicates a relation among the vertical distance Z between the center of the primary coil 28 and the center of the secondary coil 44, the horizontal distance D between the center of the primary coil 28 and the center of the secondary coil 44, and the voltage value V_LPE in accordance with the vertical distance Z and the horizontal distance D.

If the positioning between the secondary coil 44 and the primary coil 28 is performed by causing the electric vehicle 40 to travel in the charging station 20, the vertical distance Z does not change but the horizontal distance D changes.

In FIG. 2, the characteristics of voltage value V_LPE versus horizontal distance D in accordance with three kinds of vertical distances Z1 to Z3 (Z1<Z2<Z3) are shown in a two-dimensional graph. As the vertical distance Z increases, the magnetic coupling becomes weaker; thus, the voltage value V_LPE decreases. On the other hand, as the horizontal distance D increases from zero, the voltage value V_LPE decreases and becomes a local minimum at a distance D1. Moreover, as the horizontal distance D increases from the distance D1, the voltage value V_LPE increases and becomes a local maximum at a distance D2. In addition, as the horizontal distance D increases from the distance D2, the voltage value V_LPE decreases and becomes zero when detection has become impossible.

As expressed in FIG. 2, the characteristic of voltage value V versus LPE—horizontal distance D is determined uniquely in accordance with the vertical distance Z. Then, at the distance D2 at which the voltage value V_LPE is the local maximum, the local maximum values (voltage values V_LPE) are different depending on the vertical distances Z. That is to say, the local maximum value in each characteristic is unique to each characteristic. Therefore, in a case where the positioning between the secondary coil 44 and the primary coil 28 is performed, the vertical distance Z can be estimated from the voltage value V_LPE when the voltage value V_LPE is the local maximum value, that is, when the position differential value dV/dX becomes zero. Then, the characteristic of voltage value V_LPE versus horizontal distance D for the estimated vertical distance Z is specified and by using that characteristic, the horizontal distance D can be estimated.

Note that in each characteristic of voltage value V_LPE versus horizontal distance D shown in FIG. 2, when the horizontal distance D is zero, or near D1 or D2, the position differential value dV/dX is zero. The voltage value V_LPE when the horizontal distance D is zero is the maximum in each characteristic. However, when the horizontal distance D is zero, the center of the primary coil 28 and the center of the secondary coil 44 already coincide with each other. Therefore, in the positioning process, the maximum voltage value V_LPE (D=0) is not used as the material to determine the vertical distance Z. The voltage value V_LPE that is used as the material to determine the vertical distance Z is the voltage value V_LPE (local maximum value) at the position at the distance D2 where, after the vehicle approaches from far in the horizontal distance D and the position differential value dV/dX starts to change, the position differential value dV/dX becomes zero for the first time.

3. Positioning Process

Figure 3A:
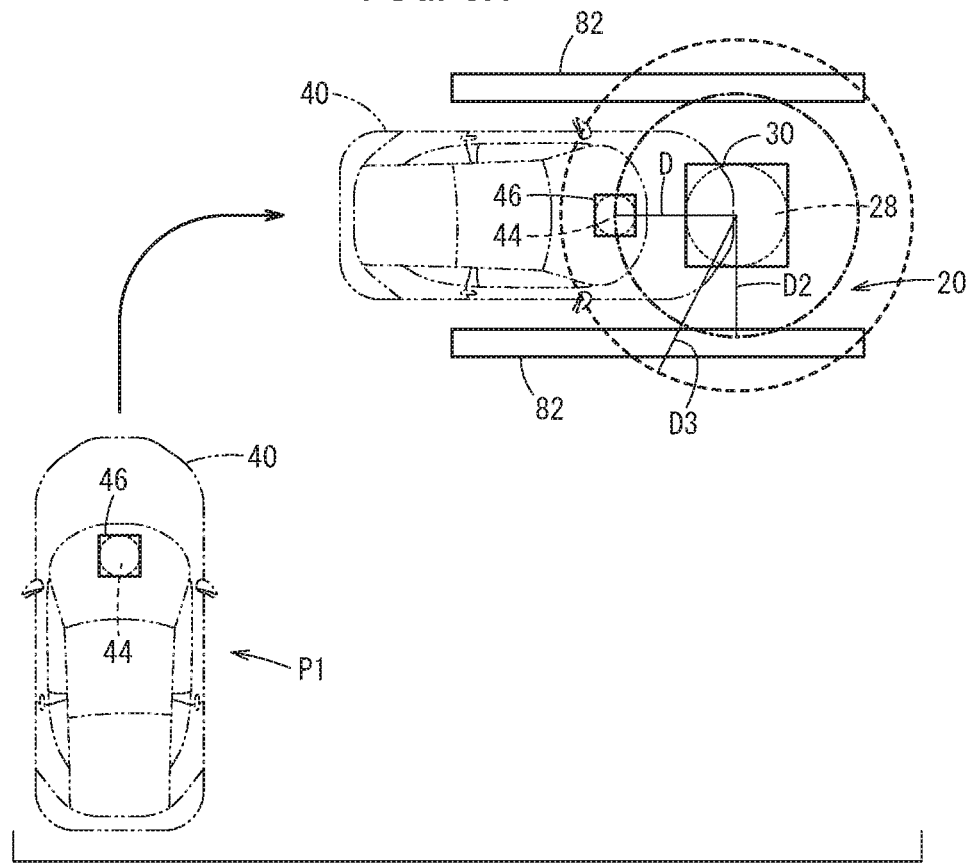
FIG. 3A and FIG. 3B are explanatory diagrams for describing a parking operation of an electric vehicle relative to a charging station.
Figure 3B:
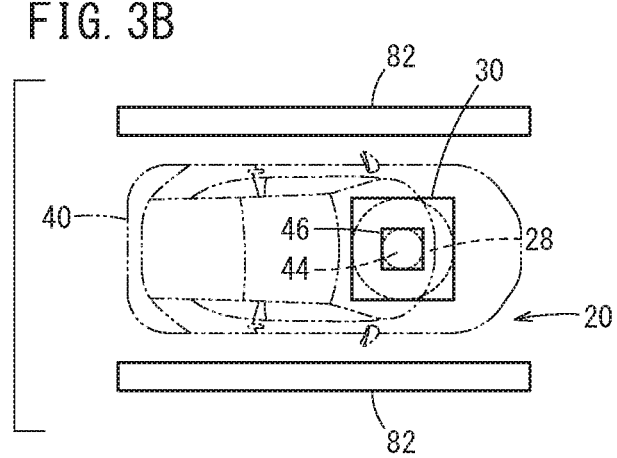
Figure 4:
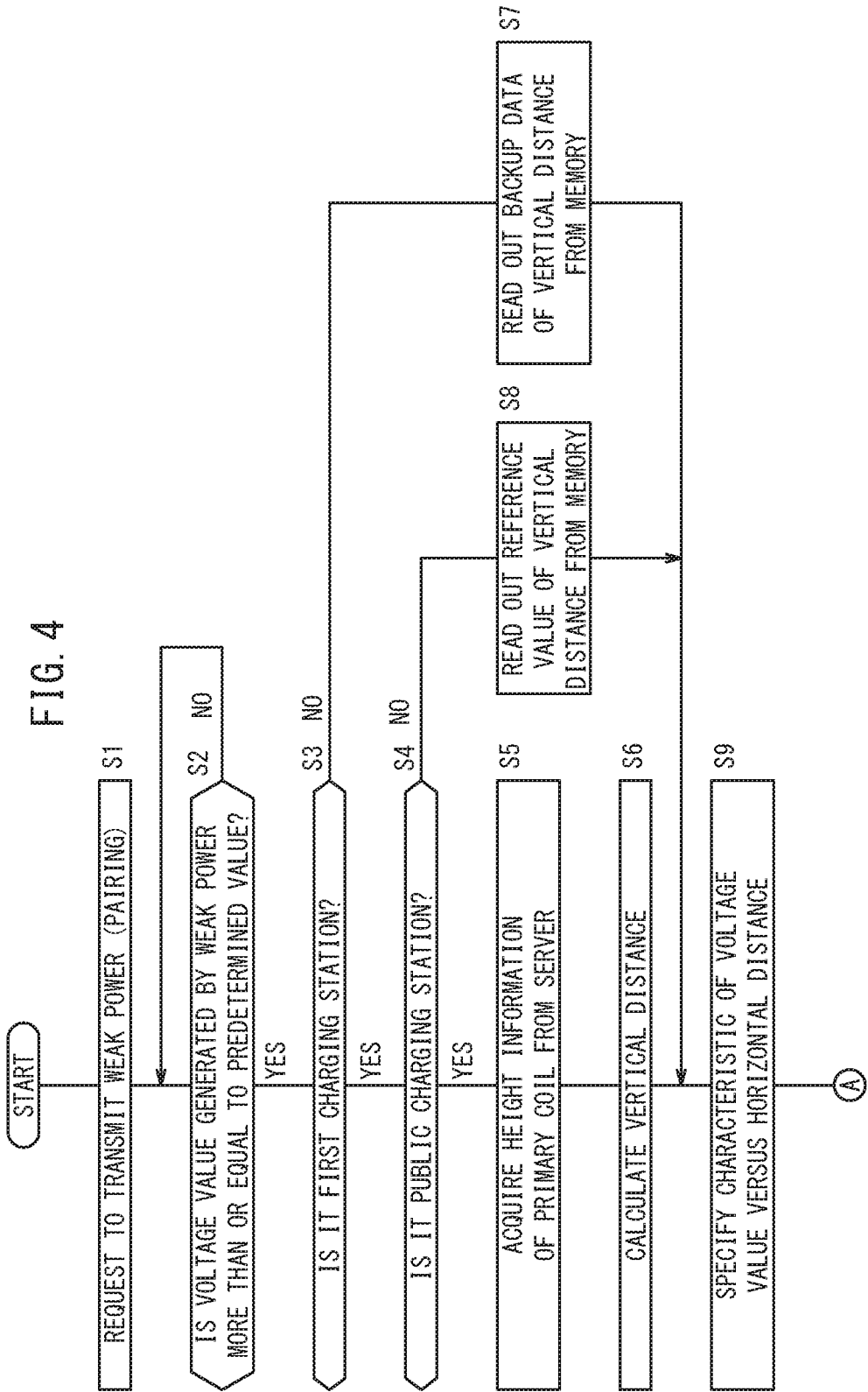
FIG. 4 is a flowchart expressing a first half of a positioning process between a primary coil and a secondary coil in the embodiment of the present invention.
Figure 5:
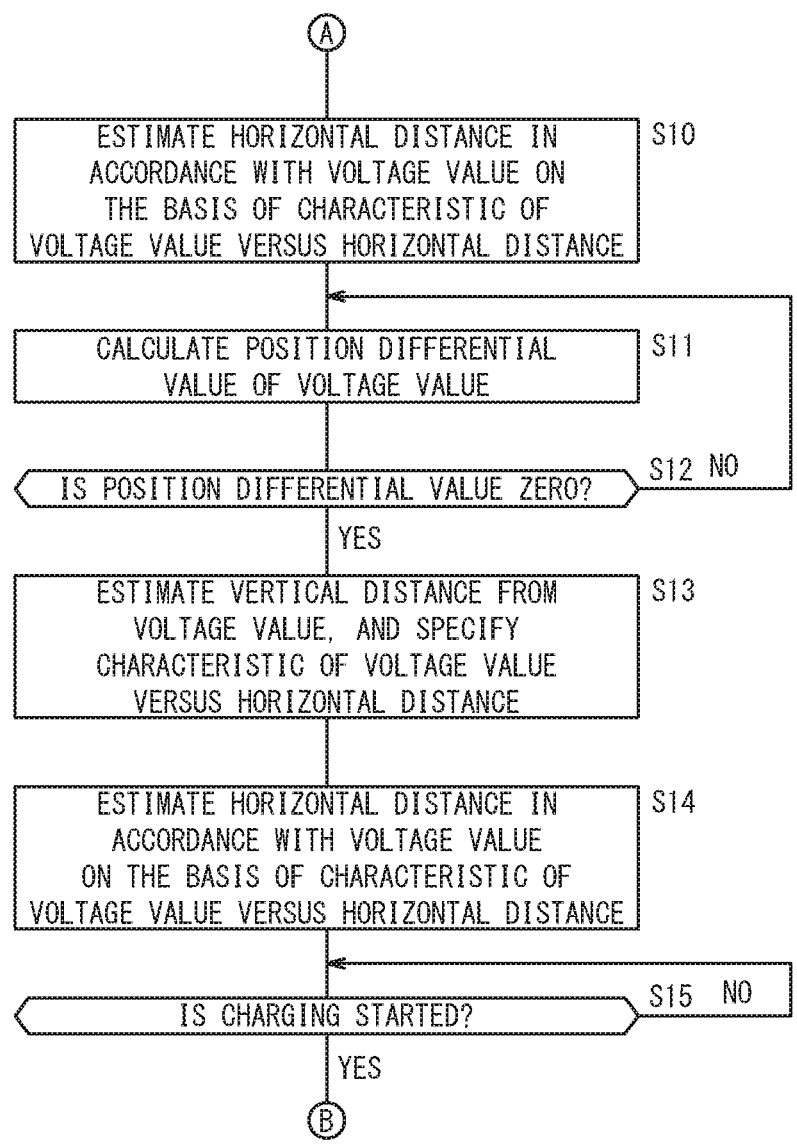
FIG. 5 is a flowchart expressing a second half of the positioning process between the primary coil and the secondary coil in the embodiment of the present invention.

The positioning process performed on the electric vehicle 40 side is described mainly with reference to FIG. 4 and FIG. 5. The process to be described below is performed when the driver of the electric vehicle 40 turns on a start switch (not shown) of the positioning process. As illustrated in FIG. 3A, for example, the charging station 20 is defined by lines 82. The driver turns on a parking start switch at a position P1 that is separated from the charging station 20, and causes the electric vehicle 40 to travel toward the charging station 20. An operation signal of the parking start switch is transmitted to the secondary side control unit 56.

In step S1, the charging management unit 58 instructs the secondary side communications device 68 to transmit a transmission request for weak power. The secondary side communications device 68 performs pairing for authentication with the primary side communications device 36, for example, and transmits a transmission request signal to request weak power. The primary side control unit 34 controls the power converter 26 in accordance with the transmission request signal received in the primary side communications device 36 to start the power transmission. The power converter 26 converts the alternating current power into a predetermined weak power, and supplies the weak power to the primary coil 28. Then, the weak power for positioning is transmitted from the primary coil 28 to the outside.

In step S2, the charging management unit 58 determines whether the voltage value V_LPE generated by the weak power is more than or equal to a predetermined value. As the electric vehicle 40 travels, the secondary coil 44 approaches the primary coil 28. When the secondary coil 44 has reached a position where the weak power of the primary coil 28 can be received (at a position where horizontal distance D=distance D3), the voltage value V_LPE that is detected by the voltage detector 50 becomes more than or equal to the predetermined value. If the voltage value V_LPE is more than or equal to the predetermined value (step S2: YES), the process advances to step S3. On the other hand, if the voltage value V_LPE is less than the predetermined value (step S2: NO), the process in step S2 is repeated.

If the process has advanced from step S2 to step S3, the charging management unit 58 instructs the secondary side communications device 68 to transmit a transmission request for the ID of the charging station 20 and the attribute information of the charging station 20. The secondary side communications device 68 transmits to the primary side communications device 36, the transmission request signal for the ID and the attribute information of the charging station 20. The primary side control unit 34 reads out the ID and the attribute information of the charging station 20 from the memory 38 in accordance with the transmission request signal received in the primary side communications device 36, and transmits the ID and the attribute information to the secondary side communications device 68 through the primary side communications device 36.

In step S3, the charging management unit 58 determines whether the charging station 20 to which the electric vehicle 40 performs the positioning is the charging station where the charging is performed for the first time. That is to say, the charging management unit 58 searches the past charging history saved in the memory 66 by using the ID of the charging station 20 as a search key. If the ID of the charging station 20 does not coincide with any of the IDs in the charging history in the memory 66, the charging management unit 58 determines that the charging station 20 is the first charging station (a charging station for the first time). If the ID of the charging station 20 coincides with one or more IDs in the charging history in the memory 66, the charging management unit 58 determines that the charging station 20 is not the first charging station.

If it is determined that the charging station 20 is the first charging station in step S3, the process advances to step S4. In step S4, the charging management unit 58 determines whether the charging station 20 is a public charging station on the basis of the attribute information of the charging station 20.

In step S4, if it is determined that the charging station 20 is the public charging station, the process advances to step S5. In step S5, the charging management unit 58 instructs the secondary side communications device 68 to transmit a signal to the server 90, the signal expressing that the charging is to be performed in the charging station 20. The secondary side communications device 68 performs pairing for authentication with the server side communications device of the server 90, for example, and transmits a transmission request signal requesting the height (height information) h1 of the primary coil 28 of the charging station 20 from the road surface 12. In accordance with the transmission request signal received in the server side communications device, the server 90 transmits the height h1 of the primary coil 28 of the charging station 20 from the road surface 12, and the secondary side communications device 68 acquires the height h1 from the server 90.

In step S6, the vertical distance estimation unit 62 estimates (calculates) the vertical distance Z between the primary coil 28 and the secondary coil 44 on the basis of the height h1 acquired in step S5 and the height h2 of the secondary coil 44 that is read out from the memory 66. The vertical distance Z is calculated as a difference obtained in a manner that the height h1 of the primary coil 28 from the road surface 12 is subtracted from the height h2 of the secondary coil 44 from the road surface 12.

On the other hand, if it is determined that the charging station 20 is not the first charging station in step S3, that is, if it is determined that the charging has been performed in the charging station 20 in the past, the process advances to step S7. In step S7, the charging management unit 58 reads out the backup data of the vertical distance Z from the memory 66. The backup data of the vertical distance Z is the value of the vertical distance Z that is already estimated in the previous charging in the charging station 20.

If it is determined that the charging station 20 is not the public charging station in step S4, the process advances to step S8. The process advances to step S8 when the charging station 20 is the first charging station and is not the public charging station, for example, the charging station installed in a parking place at a friend's house that has never been visited before.

Here, there is no backup data based on the past charging history stored in the memory 66 and the height (height information) h1 of the primary coil 28 from the road surface 12 cannot be acquired from the server 90. In view of this, the charging management unit 58 reads out a reference value stored in advance in the memory 66 as the value of the vertical distance Z in step S8. Here, the reference value of the vertical distance Z can be an arbitrary value; for example, the vertical distance Z between the primary coil 28 and the secondary coil 44 when it is assumed that the height h1 of the primary coil 28 from the road surface 12 is zero, that is, the height h2 of the secondary coil 44 from the road surface 12 is used, for example.

Next, in step S9, the horizontal distance estimation unit 64 specifies the voltage value versus distance information (FIG. 2) for the vertical distance Z from the map M stored in the memory 66 on the basis of the vertical distance Z determined in step S6, step S7, or step S8. For example, if the vertical distance is Z1, the characteristic of voltage value V_LPE versus horizontal distance D for the vertical distance Z1 is used in the subsequent process.

In step S10, the horizontal distance estimation unit 64 estimates the horizontal distance D in accordance with the voltage value V_LPE on the basis of the characteristic of voltage value V_LPE versus horizontal distance D (for example, characteristic for vertical distance Z1) specified in step S9, and the voltage value V_LPE detected by the voltage detector 50. The charging management unit 58 causes the display device 72 to display the horizontal distance D estimated by the horizontal distance estimation unit 64. The driver operates the travel device 74 while observing the display device 72, and starts to perform the positioning between the center of the secondary coil 44 and the center of the primary coil 28.

In step S11, the differential value calculation unit 60 calculates the position differential value dV/dX on the basis of the voltage value V_LPE detected by the voltage detector 50 and the travel distance X detected by the distance sensor 70.

In step S12, the differential value calculation unit 60 determines whether the position differential value dV/dX is zero. As shown in FIG. 3A, when the horizontal distance D between the center of the primary coil 28 and the center of the secondary coil 44 has become D2 and the voltage value V_LPE is at the local maximum, the position differential value dV/dX is zero. If the position differential value dV/dX is zero (step S12: YES), the process advances to step S13. On the other hand, if position differential value dV/dX is not zero (step S12: NO), the process returns to step S11.

If the process has advanced from step S12 to S13, the vertical distance estimation unit 62 estimates the vertical distance Z on the basis of the voltage value V_LPE when the position differential value dV/dX is zero and the map M stored in the memory 66. For example, as shown in FIG. 2, if the voltage value V_LPE when the position differential value dV/dX is zero is V1_LPE, it is the characteristic of voltage value V_LPE versus horizontal distance D for the vertical distance Z1 that becomes V1_LPE at local maximum. In this case, the vertical distance estimation unit 62 estimates that the vertical distance Z is Z1. If the vertical distance Z1 estimated in step S13 is different from the vertical distance Z determined in step S6, step S7, or step S8, the vertical distance Z estimated in step S10 is used instead. Then, on the basis of the vertical distance Z estimated in step S10, the characteristic of voltage value V_LPE versus horizontal distance D is specified. That is to say, step S13 is a step of correcting the value of the vertical distance Z on the basis of the voltage value V_LPE when the position differential value dV/dX is zero.

In step S14, the horizontal distance estimation unit 64 estimates the horizontal distance D on the basis of the characteristic of voltage value V_LPE versus horizontal distance D (for example, characteristic for vertical distance Z1) specified in step S10 and the voltage value V_LPE detected by the voltage detector 50. The charging management unit 58 causes the display device 72 to display the horizontal distance D estimated by the horizontal distance estimation unit 64. The driver operates the travel device 74 while observing the display device 72, and the positioning between the center of the secondary coil 44 and the center of the primary coil 28 is continued.

In step S15, the charging management unit 58 determines whether the parking of the electric vehicle 40 ends and the charging is started. When the horizontal distance D between the primary coil 28 and the secondary coil 44 has become zero and the positioning between the center of the primary coil 28 and the center of the secondary coil 44 ends, the driver stops (parks) the electric vehicle 40 and turns on a charging start switch (not shown). If the charging start switch is turned on (step S15: YES), it is determined that the parking of the electric vehicle 40 is completed and a series of steps of the positioning process is completed. On the other hand, if the charging start switch is not turned on (step S15: NO), the operation of turning on the charging start switch is awaited.

If the charging start switch is turned on (step S15: YES), an operation signal of the charging start switch is transmitted to the secondary side control unit 56. The charging management unit 58 instructs the secondary side communications device 68 to transmit a stop request for the weak power and a transmission request for the charging power. The secondary side communications device 68 transmits the stop request signal of the weak power and the transmission request signal of the charging power to the primary side communications device 36. The primary side control unit 34 stops the power transmission of the weak power by controlling the power converter 26 in accordance with the stop request signal received in the primary side communications device 36, and starts to transmit the charging power by controlling the power converter 26 in accordance with the transmission request signal received in the primary side communications device 36.

4. Process of Estimating Vertical Distance Z after Positioning

Figure 6:
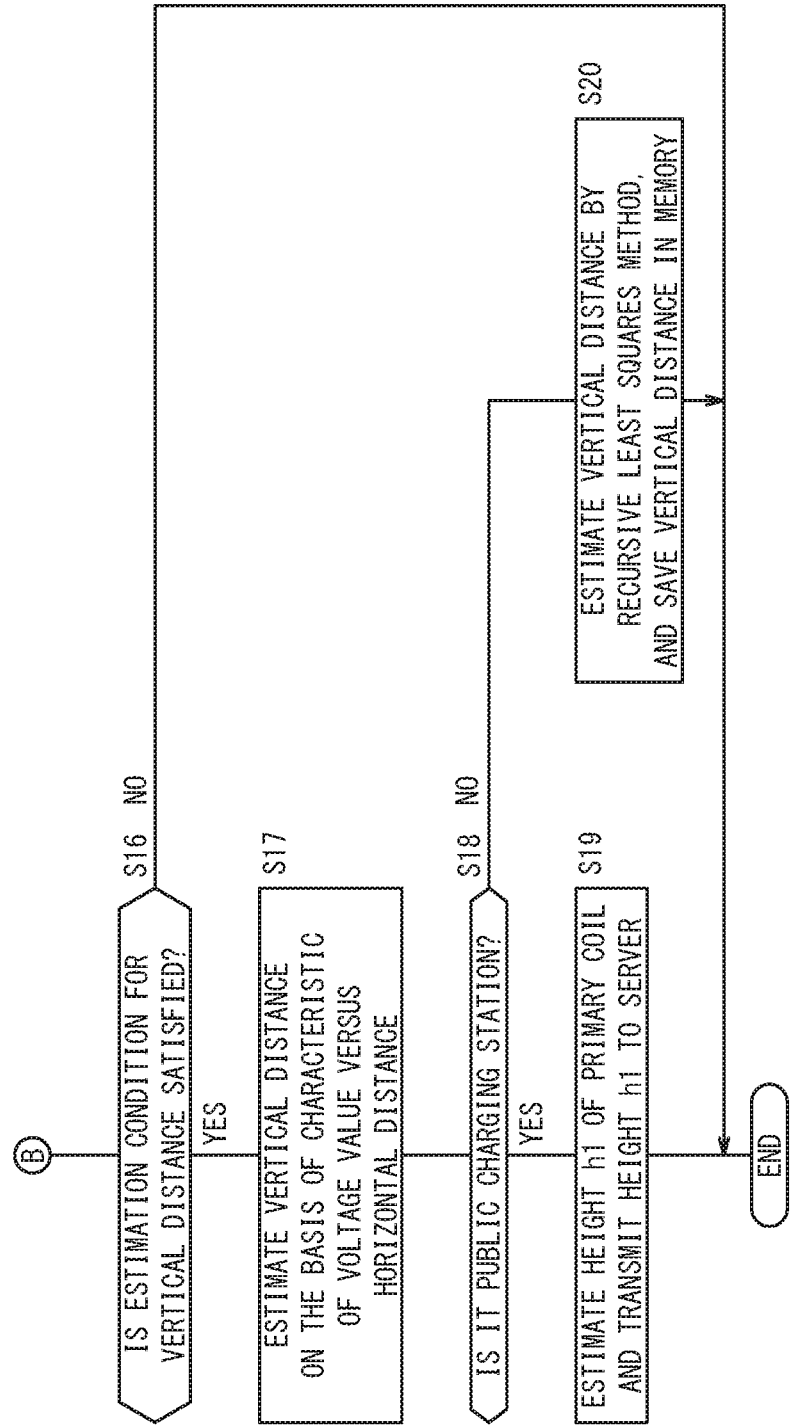
FIG. 6 is a flowchart expressing a process of estimating a vertical distance between the primary coil and the secondary coil performed after the positioning between the primary coil and the secondary coil in the embodiment of the present invention.

Next, mainly with reference to FIG. 6, description is made of a process of estimating the vertical distance Z between the primary coil 28 and the secondary coil 44 performed on the electric vehicle 40 side after the parking of the electric vehicle 40 is completed.

If the process has advanced from step S15 to step S16, the vertical distance estimation possibility determination unit 65 determines whether the condition for estimating the vertical distance Z is satisfied and the vertical distance Z can be estimated.

The vertical distance estimation possibility determination unit 65 determines that the vertical distance Z can be estimated under a condition that the voltage value V_LPE detected by the voltage detector 50 is more than or equal to a predetermined threshold. If the voltage value V_LPE is more than or equal to the predetermined threshold, the vertical distance estimation possibility determination unit 65 determines that the electric vehicle 40 is currently at a position where charging is possible, and the vertical distance Z between the primary coil 28 and the secondary coil 44 can be estimated (step S16: YES). If the voltage value V_LPE is less than the predetermined threshold (step S16: NO), the process is not performed any further and the process of estimating the vertical distance Z ends.

If the process has advanced from step S16 to step S17 (step S16: YES), the vertical distance estimation unit 62 estimates the vertical distance Z between the primary coil 28 and the secondary coil 44 on the basis of the voltage value V_LPE. It is already known that, in a region where the voltage value V_LPE is more than or equal to the predetermined threshold (region where the horizontal distance D is close to zero and charging is possible), the relation between the vertical distance Z and the voltage value V_LPE can be approximated to a relation of inverse proportion where the voltage value V_LPE decreases at a constant rate as the vertical distance Z increases. The vertical distance estimation unit 62 estimates the vertical distance Z on the basis of the voltage value V_LPE and the characteristic of the voltage V_LPE versus horizontal distance D stored in the memory 66. The height h1 of the primary coil 28 from the road surface 12 is estimated from the estimated vertical distance Z and the height h2 of the secondary coil 44 from the road surface 12 that is stored in advance in the memory 66.

Next, in step S18, the charging management unit 58 instructs the secondary side communications device 68 to transmit the transmission request for the ID of the charging station 20 and the attribute information of the charging station 20. The secondary side communications device 68 transmits to the primary side communications device 36, the transmission request signal for the ID and the attribute information of the charging station 20. The primary side control unit 34 reads out the ID and the attribute information of the charging station 20 from the memory 38 in accordance with the transmission request signal received in the primary side communications device 36, and transmits the ID and the attribute information to the secondary side communications device 68 through the primary side communications device 36.

Furthermore, in step S18, the charging management unit 58 determines the attribute of the charging station 20. That is to say, the charging management unit 58 determines whether the charging station 20 is the public charging station or the private (dedicated) charging station that transmits power only to the particular electric vehicle 40.

If it is determined that the charging station 20 is the public charging station in step S18, the process advances to step S19. In step S19, the charging management unit 58 transmits to the server 90, the height h1 of the primary coil 28 from the road surface 12 that is estimated in step S17 and the height h2 of the secondary coil 44 from the road surface 12 through the secondary side communications device 68. The server 90 stores the height h1 of the primary coil 28 from the road surface 12 and the height h2 of the secondary coil 44 from the road surface 12 that are received through the server side communications device.

Note that the server 90 receives from the plural electric vehicles 40, the height h1 of the primary coil 28 from the road surface 12 and the height h2 of the secondary coil 44 from the road surface 12 for the same charging station 20. Every time the server 90 receives the data, the vertical distance Z that is regarded the closest to the actual distance is estimated and stored by using a recursive least squares method, for example. In this case, it is preferable that what is called an outlier is excluded and only the data with high reliability are extracted to estimate the height h1 of the primary coil 28 from the road surface 12 or the vertical distance Z.

On the other hand, in step S18, if it is determined that the charging station 20 is not the public charging station but the private charging station, the process advances to step S20. In step S20, the charging management unit 58 estimates and stores the vertical distance Z that is regarded the closest to the actual distance by using the recursive least squares method, for example, on the basis of the vertical distance Z estimated in step S17 and the backup data of the vertical distance Z estimated in the past.

Note that the data including the vertical distance Z and the height h1 of the primary coil 28 from the road surface 12 stored in the server 90 through the above process (especially, step S19) are transmitted to the electric vehicle 40 that will be charged in the charging station 20 in the next charging.

In this manner, the non-contact power transmission system 10 according to the embodiment of the invention in the present application is a system in which pieces of parameter information (including the vertical distance Z and the height h1 of the primary coil 28 from the road surface 12) of the public charging stations 20 are acquired from the electric vehicles 40 that have used the charging stations 20 and aggregated in the server 90, and after necessary data analysis of the aggregated parameter information, these pieces of information are fed back to another electric vehicle 40 that will use the charging station 20.

Figure 7:
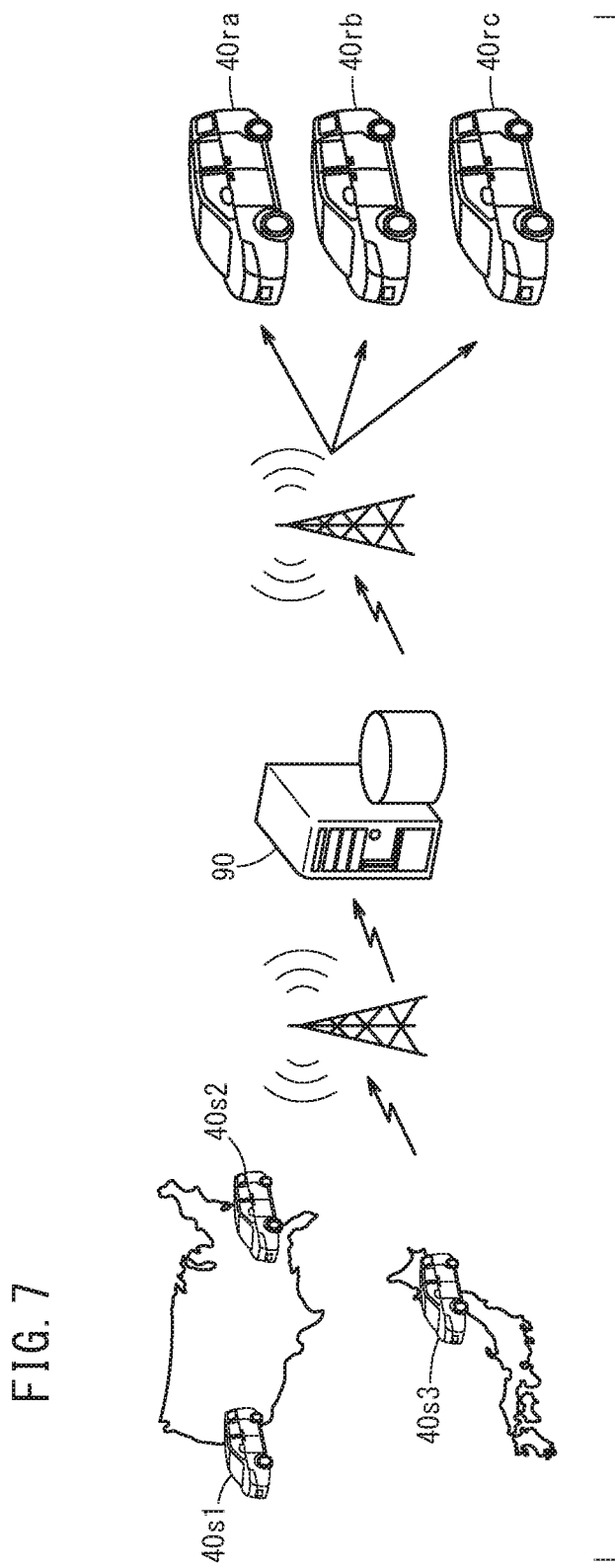
FIG. 7 is an explanatory diagram expressing an overview of a non-contact power transmission system according to the embodiment of the present invention.

Description is made of an example in which a plurality of electric vehicles 40s1, 40s2, 40s3 illustrated in FIG. 7 performs non-contact charging at different public charging stations (not shown). These electric vehicles 40s1, 40s2, 40s3 transmit to the server 90 by wireless communications through a base station, the positional information of the own vehicles and parameter information regarding the charging stations that the own vehicles have used (including the vertical distance Z and the height h1 of the primary coil 28 from the road surface 12).

The server 90 having received the parameter information of the charging stations specifies the charging stations on the basis of the positional information of the electric vehicles 40s1, 40s2, 40s3, and holds the parameter information for each charging station (including the vertical distance Z and the height h1 of the primary coil 28 from the road surface 12).

On the other hand, other electric vehicles 40ra, 40rb, 40rc that will use these charging stations, when performing charging at the charging stations, request the server 90 to transmit the parameter information regarding the charging stations that the own vehicles will use. The server 90 transmits the parameter information regarding the charging stations to the electric vehicles 40ra, 40rb, 40rc that have made the transmission request. Thus, the electric vehicles 40ra, 40rb, 40rc can perform more accurate positioning on the basis of the parameter information acquired from the server 90.

In addition, after the charging is started, the electric vehicles 40ra, 40rb, 40rc themselves transmit to the server 90, the positional information of the own vehicles and the parameter information regarding the charging stations that the own vehicles have used. By repeating such a cycle, the server 90 holds the plural pieces of parameter information regarding the same public charging station.

Every time receiving the parameter information regarding the same public charging station, the server 90 estimates the parameter information that is regarded the closest to the actual information by using the recursive least squares method, for example, and saves the information. Thus, the server 90 can provide the more accurate parameter information of the charging station to the electric vehicles 40ra, 40rb, 40rc that will use the charging stations.

Note that the server 90 may acquire in advance the positional information of the electric vehicles 40s1, 40s2, 40s3 from the electric vehicles. That is to say, the server 90 may specify the public charging stations closest to the electric vehicles 40s1, 40s2, 40s3 on the basis of the positional information, and transmit the parameter information of the specified charging stations.

5. Summary of Embodiment

The non-contact power transmission system 10 according to the embodiment of the present invention is the non-contact power transmission system 10 for transmitting power without contact from the primary coil 28 that is provided for the charging station 20 to the secondary coil 44 that is provided for the electric vehicle (vehicle) 40, and includes the server (information aggregation device) 90 configured to aggregate height (height information) h1 of the primary coil 28 from the road surface 12 at the installation position of each charging station 20, wherein when the signal expressing that charging is performed at the charging station 20 at the desired position has been received from the secondary side control unit 56 of the electric vehicle 40 through the secondary side communications device 68 of the electric vehicle 40, the server 90 is configured to transmit to the secondary side control unit 56 of the electric vehicle 40, the height (height information) h1 of the primary coil 28 of the charging station 20 at the desired position from the road surface 12.

By the above configuration, in the non-contact charging at the charging station at the desired position among the charging stations in the market, the positioning between the primary coil 28 and the secondary coil 44 can be performed accurately.

The electric vehicle 40 includes the secondary side control unit 56 configured to control the positioning between the primary coil 28 and the secondary coil 44. The secondary side control unit 56 is configured to, when receiving the weak power transmitted from the primary coil 28 for the positioning, perform the positioning between the primary coil 28 and the secondary coil 44 on the basis of the height h1 of the primary coil 28 from the road surface 12 that is transmitted from the server 90.

In the configuration as above, a constant amount of weak power is transmitted from the primary coil 28 for the positioning between the primary coil 28 on the charging station 20 side and the secondary coil 44 on the electric vehicle 40 side. The weak voltage generated on the secondary coil 44 side by the weak power received at the secondary coil 44 is the voltage value V_LPE in accordance with the difference between the height h1 of the primary coil 28 from the road surface 12 and the height h2 of the secondary coil 44 from the road surface 12 (the difference is referred to as vertical distance Z). Thus, the vertical distance Z can be estimated from the height h1 of the primary coil 28 from the road surface 12 transmitted from the server 90 and the height h2 of the secondary coil 44 of the electric vehicle 40 from the road surface 12. Therefore, the horizontal distance D in accordance with the voltage value V_LPE can be estimated from the characteristic of the voltage value V_LPE and the horizontal distance D between the primary coil 28 and the secondary coil 44 for the vertical distance Z and the accurate positioning process can be performed.

6. Modifications

Note that the non-contact power transmission system according to the present invention is not limited to the aforementioned embodiment and various configurations can be employed.

6.1 First Modification: Estimation of Horizontal Distance D Using Voltage Integrated Value For example, when the horizontal distance D between the primary coil 28 and the secondary coil 44 is estimated, not just the characteristic of the voltage value V_LPE and the horizontal distance D but also the characteristic of a voltage integrated value (position-integration value regarding LPE voltage) VI_LPE and the horizontal distance D may be used.

Figure 8:
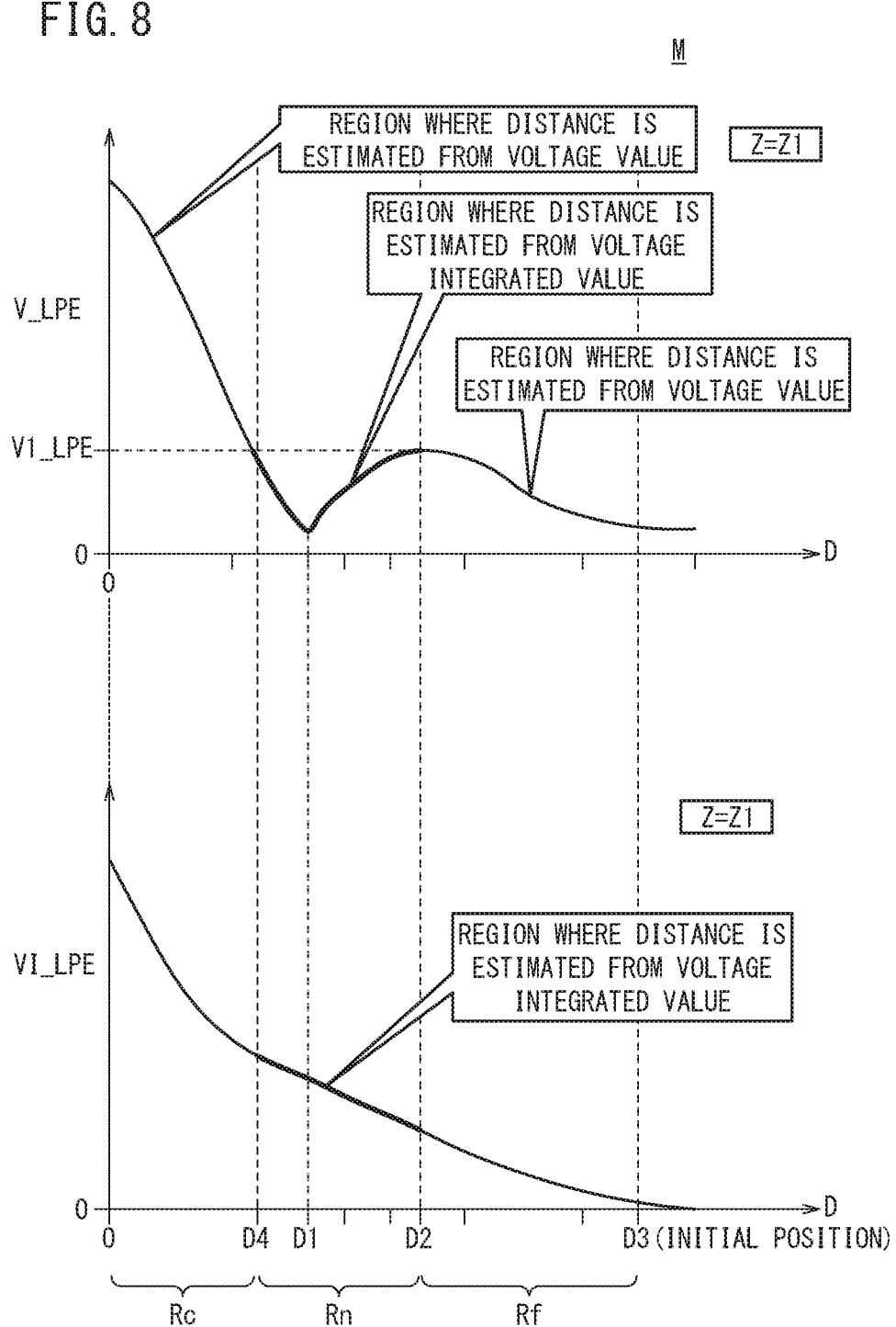
FIG. 8 is a characteristic diagram expressing voltage value-distance information, and a characteristic diagram expressing voltage integrated value-distance information.

In this first modification, the secondary side control unit 56 includes, in addition to various function units such as the vertical distance estimation unit 62, an initial position setting unit (not shown) and an integrated value calculation unit (not shown), and the memory 66 stores the map M regarding voltage integrated value versus distance information shown in FIG. 8.

When the voltage detector 50 detects the voltage value V_LPE for the first time, the initial position setting unit sets the distance D3 that is estimated based on the voltage value V_LPE and the voltage value versus distance information for the vertical distance Z (FIG. 8), as an initial value (initial position) of the horizontal distance D.

After the initial value of the horizontal distance D is set, the integrated value calculation unit calculates the voltage integrated value (position-integration value regarding LPE voltage) VI_LPE obtained by position-integration of the voltage value V_LPE of the LPE voltage on the basis of the voltage value V_LPE of the LPE voltage and the travel distance X of the electric vehicle 40.

The memory 66 of the secondary side control unit 56 stores the voltage integrated value versus distance information shown in FIG. 8 as the map M. This voltage integrated value versus distance information is a characteristic of voltage integrated value versus distance that indicates a relation between a distance between a reference part of the primary coil 28 and a reference part of the secondary coil 44, and the voltage integrated value VI_LPE in accordance with the distance. More specifically, the voltage integrated value versus distance information is a characteristic of voltage integrated value versus distance that indicates a relation among the vertical distance Z between the center of the primary coil 28 and the center of the secondary coil 44, the horizontal distance D between the center of the primary coil 28 and the center of the secondary coil 44, and the voltage integrated value VI_LPE in accordance with the vertical distance Z and the horizontal distance D.

In each characteristic of the voltage integrated value VI_LPE versus horizontal distance D, the voltage integrated value VI_LPE monotonically increases as the horizontal distance D decreases from the distance D3 to zero. Therefore, on the basis of the characteristic of the voltage integrated value VI_LPE versus horizontal distance D that is specified in accordance with the vertical distance Z and the voltage integrated value VI_LPE calculated from the voltage value V_LPE and the travel distance X, the horizontal distance D can be uniquely determined.

In view of this, in the first modification, the characteristic of the voltage value V_LPE versus horizontal distance D shown in FIG. 8 is divided into three regions of a far distance region Rf, a middle distance region Rn, and a near distance region Rc. In the middle distance region Rn, the horizontal distance D is estimated based on the voltage integrated value VI_LPE.

Here, the middle distance region Rn includes a region from the distance D2 where the voltage value V_LPE becomes the local maximum value V1_LPE to the distance D1 where the voltage value V_LPE is the local minimum, and a region from the distance D1 to a distance D4 where the voltage value V_LPE becomes a value that is the same as the local maximum value V1_LPE at the distance D2 again.

In this manner, in the first modification, in the middle distance region Rn, the horizontal distance D between the primary coil 28 and the secondary coil 44 is estimated by using the characteristic of the voltage integrated value VI_LPE and the horizontal distance D. Therefore, the horizontal distance D can be determined uniquely from the voltage integrated value VI_LPE, and the positioning between the primary coil 28 and the secondary coil 44 can be performed more accurately.

6.2 Second Modification: Process of Determining Whether Secondary Coil 44 Is Positive or Negative Relative to Primary Coil 28

In a second modification, whether the secondary coil 44 is in front of or behind (at a positive position or a negative position relative to) the primary coil 28 is estimated on the basis of the voltage value V_LPE detected by the voltage detector 50, the position differential value dV/dX regarding the LPE voltage, the voltage integrated value VI_LPE, and the shift position Sp.

In the second modification, the electric vehicle 40 includes the distance sensor 70 and the like, and moreover includes a shift position sensor that is not shown. The shift position sensor is connected to the secondary side control unit 56 through an in-vehicle communications line that is not shown. The shift position (parking position, reverse position, neutral position, drive position) detected by the shift position sensor is used in the secondary side control unit 56.

The secondary side control unit 56 functions as a positive/negative determination unit in addition to various function units such as the differential value calculation unit 60. This positive/negative determination unit determines positive/negative on a virtual D axis connecting between the secondary coil 44 and the primary coil 28. Specifically, whether the secondary coil 44 approaches or is separated from the primary coil 28 is estimated based on whether the position differential value dV/dX is positive or negative, and whether the electric vehicle 40 travels forward or backward is determined based on the shift position.

For example, if the position differential value dV/dX is positive and the shift position is the same as the shift position when the electric vehicle 40 has passed the initial position (distance D3) (for example, drive position), it is determined that the secondary coil 44 is still in front of the primary coil 28 (positive).

In this manner, as the horizontal distance D between the primary coil 28 and the secondary coil 44 becomes smaller, the position differential value dV/dX increases. By using the moving direction of the own vehicle (electric vehicle 40) additionally, whether the own vehicle (electric vehicle 40) is at a position before passing the primary coil or after passing the primary coil can be determined accurately.

6.3 Summary of Modifications

In the non-contact power transmission system 10 according to the modification, in the positioning between the primary coil 28 and the secondary coil 44, when the electric vehicle 40 moves to be displaced toward the secondary coil 44 and the secondary side control unit 56 detects the voltage value V_LPE generated by the weak power for the first time, the secondary side control unit 56 of the electric vehicle 40 is configured to set the distance position from the secondary coil 44 to an initial position for the positioning.

By the above configuration, the initial position for the positioning between the primary coil 28 and the secondary coil 44 by the weak power (position to satisfy horizontal distance D=D3) can be set certainly.

In addition, the secondary side control unit 56 of the electric vehicle 40 includes the relation between the voltage value V_LPE and the horizontal distance D between the primary coil 28 and the secondary coil 44, and the relation between the horizontal distance D and the voltage integrated value VI_LPE obtained by position-integration of the voltage value V_LPE.

In the graph expressing the relation (weak voltage value characteristic) between the voltage value V_LPE and the horizontal distance D between the primary coil 28 and the secondary coil 44, there is a concavity (region where the horizontal distance D is not determined uniquely from the voltage value V_LPE). On the other hand, in the relation between the horizontal distance D and the voltage integrated value VI_LPE, the voltage integrated value VI_LPE monotonically increases as the horizontal distance D decreases. Therefore, by including the relation between the horizontal distance D and the voltage integrated value VI_LPE obtained by position-integration of the voltage value V_LPE, the horizontal distance D can be estimated based on the relation and the positioning between the primary coil 28 and the secondary coil 44 can be performed certainly.

The electric vehicle 40 is configured to calculate a differential value of the voltage value V_LPE, and determine whether the secondary coil 44 of the vehicle (electric vehicle 40) is at a position before passing the primary coil 28 or after passing the primary coil 28 on the basis of a moving direction of the own vehicle (electric vehicle 40) and the position differential value dV/dX.

The position differential value dV/dX increases as the horizontal distance D between the primary coil 28 and the secondary coil 44 becomes smaller. Therefore, by using the moving direction of the electric vehicle 40 additionally, whether the electric vehicle 40 is at a position before passing the primary coil 28 or after passing the primary coil 28 can be determined accurately.

Note that the present invention is not limited to the above embodiment or modifications, and various configurations can be employed without departing from the gist of the present invention. For example, the non-contact power transmission system according to the present invention is also applicable to a vehicle including a parking assist device or an automated parking device in which at least one of steering, driving, and braking is performed automatically (for example, Japanese Laid-Open Patent Publication No. 2015-074266).

What is claimed is:

1. A non-contact power transmission system for transmitting power without contact from a primary coil that is provided for a charging station to a secondary coil that is provided for a vehicle, the system comprising an information aggregation device configured to aggregate height information of the primary coil from a road surface at an installation position of the charging station,
wherein
the information aggregation device is configured to, in response to receiving, from a control unit of the vehicle, a signal expressing that charging is to be performed at the charging station at a position, transmit to the control unit the height information of the primary coil of the charging station at the position from the road surface,
the control unit stores a definition of a relation between a voltage value generated by a weak power transmitted from the primary coil before charging and a horizontal distance between the primary coil and the secondary coil, and
the control unit is configured to:
estimate a vertical distance between the primary coil and the secondary coil on a basis of the height information of the primary coil and height information of the secondary coil stored in the control unit,
calculate a position differential value on a basis of the voltage value generated by the weak power and a travel distance of the vehicle, the position differential value representing a change amount of the voltage value relative to the travel distance, and
in response to determining that the position differential value becomes zero or a value within a predetermined range of error relative to zero, correct a value of the vertical distance on a basis of the relation between the voltage value and the horizontal distance.

2. The non-contact power transmission system according to claim 1, wherein:
the vehicle includes the control unit configured to control positioning between the primary coil and the secondary coil; and
the control unit is configured to, when receiving the weak power transmitted from the primary coil for the positioning, perform the positioning between the primary coil and the secondary coil on a basis of the height information of the primary coil from the road surface.

3. The non-contact power transmission system according to claim 2, wherein:
the vertical distance between the primary coil and the secondary coil on a basis of the height information of the primary coil; and
the control unit is configured to specify the relation between the horizontal distance and the voltage value on a basis of the vertical distance estimated by the vertical distance estimation unit.

4. The non-contact power transmission system according to claim 3, wherein in the positioning between the primary coil and the secondary coil, the control unit is configured to, when the vehicle moves to be displaced toward the secondary coil and the control unit of the vehicle detects the voltage value for a first time, set a distance position from the secondary coil to an initial position for the positioning.

5. The non-contact power transmission system according to claim 4, wherein the control unit of the vehicle stores the definition of the relation between the voltage value and the horizontal distance between the primary coil and the secondary coil, and a definition of a relation between the horizontal distance and a weak voltage integrated value obtained by position-integration of the voltage value.

6. The non-contact power transmission system according to claim 5, wherein the vehicle is configured to determine whether the vehicle is at a position before passing the primary coil or after passing the primary coil on a basis of a moving direction of the vehicle and the position differential value.

7. A non-contact power transmission system for transmitting power without contact from a primary coil that is provided for a charging station to a secondary coil that is provided for a vehicle, the system comprising:
- an information aggregation device configured to aggregate first height information of the primary coil from a road surface at an installation position of the charging station; and
- a control unit installed in the vehicle, the control unit being configured to estimate a horizontal distance or a vertical distance between the primary coil and the secondary coil on a basis of the first height information of the primary coil, wherein the control unit is configured to:
- correct the first height information on a basis of a first voltage value generated by a weak power transmitted from the primary coil before charging and the horizontal distance or the vertical distance;
- estimate second height information on a basis of a second voltage value generated by a charging power while charging;
- transmit, to the information aggregation device, parameter information including the second height information estimated on the basis of the second voltage value generated by the charging power, and wherein the information aggregation device is configured to:
- estimate the first height information of the primary coil from the road surface through data analysis of the parameter information acquired from the control unit, and
- in response to receipt, from the control unit, of a signal expressing that charging is to be performed at the charging station at a position, transmit the first height information estimated through the data analysis to the control unit as height information of the primary coil from the road surface of the charging station at a position.

* * * * *